United States Patent
Allgaier et al.

(10) Patent No.: US 8,160,725 B2
(45) Date of Patent: Apr. 17, 2012

(54) ENERGY SAVING CONTROL FOR A FIELD DEVICE

(75) Inventors: Volker Allgaier, Haslach i.K. (DE); Andreas Isenmann, Haslach i.K. (DE)

(73) Assignee: VEGA Grieshaber KG, Wolfach (DE)

( * ) Notice: Subject to any disclaimer, the term of this patent is extended or adjusted under 35 U.S.C. 154(b) by 280 days.

(21) Appl. No.: 12/469,091

(22) Filed: May 20, 2009

(65) Prior Publication Data
US 2010/0298999 A1  Nov. 25, 2010

(51) Int. Cl.
- G05B 11/01 (2006.01)
- G06F 1/32 (2006.01)
- G06F 1/00 (2006.01)

(52) U.S. Cl. ............ 700/12; 700/295; 700/296; 73/861; 455/343.1; 455/343.2; 713/310; 713/320; 713/340; 713/323; 713/324; 713/330

(58) Field of Classification Search ............ 700/12, 700/295–296; 73/861; 455/343.1, 343.2; 713/320, 310, 340, 323, 324
See application file for complete search history.

(56) References Cited

U.S. PATENT DOCUMENTS

| | | | | |
|---|---|---|---|---|
| 5,153,558 A | * | 10/1992 | Robinson et al. | 340/428 |
| 5,229,942 A | * | 7/1993 | Nicholson et al. | 701/33 |
| 5,630,090 A | * | 5/1997 | Keehn et al. | 711/106 |
| 6,292,233 B1 | * | 9/2001 | Erba et al. | 348/730 |
| 6,910,205 B2 | * | 6/2005 | Bak et al. | 717/151 |
| 7,039,819 B1 | * | 5/2006 | Kommrusch et al. | 713/322 |
| 7,064,671 B2 | * | 6/2006 | Vanderah et al. | 340/636.1 |
| 7,369,815 B2 | * | 5/2008 | Kang et al. | 455/73 |
| 7,444,530 B2 | * | 10/2008 | Deppe et al. | 713/323 |
| 7,508,781 B2 | * | 3/2009 | Liu et al. | 370/311 |
| 7,584,656 B2 | * | 9/2009 | Senghaas et al. | 73/170.21 |
| 7,587,194 B2 | * | 9/2009 | Kouchiyama et al. | 455/343.1 |
| 7,741,952 B2 | * | 6/2010 | Denison et al. | 340/5.73 |
| 7,765,416 B2 | * | 7/2010 | Zhou | 713/320 |
| 7,778,784 B2 | * | 8/2010 | Lalla | 702/65 |
| 2003/0115491 A1 | * | 6/2003 | Williams et al. | 713/300 |
| 2003/0233156 A1 | | 12/2003 | Pihet et al. | |
| 2005/0094036 A1 | * | 5/2005 | Tichelaar | 348/730 |
| 2005/0114720 A1 | * | 5/2005 | Nien et al. | 713/320 |
| 2005/0245291 A1 | * | 11/2005 | Brown et al. | 455/572 |
| 2006/0100002 A1 | * | 5/2006 | Luebke et al. | 455/574 |
| 2006/0116102 A1 | * | 6/2006 | Brown et al. | 455/343.1 |
| 2006/0240798 A1 | * | 10/2006 | Jarosinski et al. | 455/343.1 |
| 2007/0004375 A1 | * | 1/2007 | Lindlar et al. | 455/343.1 |
| 2007/0250126 A1 | * | 10/2007 | Maile et al. | 607/16 |
| 2008/0047363 A1 | * | 2/2008 | Arms et al. | 73/862 |
| 2008/0195874 A1 | * | 8/2008 | Zhou | 713/320 |
| 2009/0217069 A1 | * | 8/2009 | Chen et al. | 713/322 |
| 2009/0248331 A1 | * | 10/2009 | Barsukov | 702/63 |

(Continued)

OTHER PUBLICATIONS

WaterLog series, "SDI-12 Radar Water Level Sensor", downloaded on Apr. 2011, pp. 43.*

(Continued)

Primary Examiner — Ramesh Patel
Assistant Examiner — Olvin Lopez Alvarez
(74) Attorney, Agent, or Firm — Fay Kaplun & Marcin, LLP

(57) ABSTRACT

A control for a field device comprises a monitoring unit that is separate from a control unit for controlling the field device which monitoring unit, when the control unit is in a sleep mode, waits for an activation signal in order to switch the control unit to the operating mode.

9 Claims, 5 Drawing Sheets

U.S. PATENT DOCUMENTS

2010/0014848 A1* 1/2010 Guthrie et al. ............... 396/205
2010/0185888 A1* 7/2010 Hahn et al. ................... 713/340
2010/0312188 A1* 12/2010 Robertson et al. ............ 604/156
2011/0001744 A1* 1/2011 Chen et al. ................... 345/212
2011/0019225 A1* 1/2011 Jung ............................ 358/1.15

OTHER PUBLICATIONS

Texas Instruments, Interfacing the 3-V MSP430 to 5-V circuits, Oct. 2002, pp. 18.*
Texas Instruments, "MSP430x2XX family User's guide", 2008, pp. 101.*

* cited by examiner

ENERGY SAVING CONTROL FOR A FIELD DEVICE

FIELD OF THE INVENTION

The invention relates to measuring systems in technical facilities, for example for measuring a fill level, a limit, a pressure or a flow. In particular, the invention relates to a control device for a field device; to a field device comprising a control; to a method for controlling a field device; to a program element for a control; and to a computer-readable medium.

TECHNOLOGICAL BACKGROUND

Field devices as components of a process monitoring system are operated in technical facilities, for example for measuring the fill level, the limit or the pressure in a container, or for measuring the flow through a pipe. To this effect many of the field devices comprise sensors by means of which the actual measuring processes are carried out. The process monitoring system can comprise further field devices, which are, for example, used for forwarding and processing the acquired measured values to a central facility. Each of the field devices comprises a control by means of which, for example, a sensor can be operated, or by means of which results measured by the sensor can be further processed or forwarded.

For the supply of energy, each of the individual field devices is connected to a current source. Individual field devices can, for example, be connected to a power grid, for example by way of a line, or, for example, if they are situated in inaccessible locations, they can be coupled to a battery or an accumulator.

Although many measuring processes may need to be carried out only a few times each day, the field devices used for measuring may consume a relatively large amount of energy. If, moreover, the field devices are battery operated, spent batteries need to be exchanged regularly. This involves maintenance effort and expenditure.

SUMMARY OF THE INVENTION

According to an embodiment of the invention, a control device for a field device which is, for example, designed for measuring a fill level, a limit, a pressure or a flow, comprises a control unit for controlling the field device, and a separate monitoring unit, wherein the control unit is designed for selectively adopting (i.e. switching to or assuming) an operating mode or a sleep mode, wherein the control unit is designed, before a sleep mode is adopted (i.e. taken or assumed), to transmit a deactivation signal to the monitoring unit, wherein the monitoring unit is designed, after an activation signal has been received, to switch the control unit to the operating mode.

The control unit for the field device comprises a monitoring unit that is separate from a control unit for controlling the field device, which monitoring unit, when the control unit is in a sleep mode, waits for an activation signal in order to change or switch the control unit back to the operating mode.

Consequently, the control unit can be optimised in relation to its capability in the operating mode, and the monitoring unit can be optimised to use as little energy as possible when waiting for the activation signal. In this way the energy consumption of the control may be reduced.

The control unit may be used for controlling electrical and/or electronic components, for example a measuring unit and/or a communication unit of the field device. In this arrangement the measuring unit is used to control a sensor that is connected to the field device, in other words to determine measured values. The communication unit is designed to transmit the measured values determined by the measuring unit to a receiver. Transmission may be by way of a line or by radio. The receiver may be a further field device or a central facility of a process monitoring- and/or process control system whose component the field device is.

Because the control comprises a monitoring unit that is separate from the control unit, the control unit and the monitoring unit are designed as different components of the control unit and can be optimised with regard to their function and in particular with regard to their energy consumption. In operating mode, in which the control unit is active and may carry out calculations and/or may communicate with other components of the field device, the control unit consumes a relatively large amount of energy when compared to its sleep mode. However, in the case of a control for a field device, the time phases in which the control unit is in operating mode may be relatively short when compared to the phases in which it is in sleep mode. For example, the control unit can be in operating mode for only a few seconds-per day, during which time, for example, it instructs the measuring unit to measure the fill level of a container, with these measured values then being further processed by the control unit and being transmitted to a central monitoring unit by way of the communication device.

During the remaining time, the control unit is in sleep mode, in which it can, for example, even be switched off, and in which it consumes little energy.

The monitoring unit is optimised to wait in an energy-saving manner for an activation signal or for a predefined event, in order to switch the control unit into operating mode after the activation signal has been received or after the predefined event has occurred.

For example, the control unit and the monitoring unit may be processors which in view of their tasks were selected for the control. The control unit may be a powerful CPU, which has been selected in view of its abilities to control the components of the field device. To this effect the control unit may also comprise its own memory and a multitude of interfaces to the various components of the control.

In contrast to the above, the monitoring unit may be a microcontroller, for example a low-power µC, which has been selected in view of its energy consumption, and which is designed to carry out only certain functions, for example switching the control unit to the operating mode, and waiting for the activation signal.

Many microprocessor chips and memory chips comprise power saving modes, already implemented by the manufacturer, for reducing energy consumption. In this arrangement, for example, various current consumers in them may be operated more slowly or are switched off. Powerful CPUs may have only limited scope for reducing current consumption, or in power saving mode nevertheless have relatively high power consumption. Small microcontrollers may consume very little current in standby state. To this effect, special microcontrollers are commercially available (for example MSP 430 by Texas Instruments). However, they may have less memory and may be not suitable for computing-intensive applications, for example controlling a complete field device.

Despite the already pre-implemented power saving modes, the current consumption of a field device with a high-output CPU may not be reducible to a level so that it can, for example, be operated using a battery, and the battery does not constantly have to be changed.

With the solution according to an aspect of the invention, the current consumption of a control device for a field device may be reduced to a fraction, and thus the service life of the battery may be significantly extended. Nevertheless, transmitting a measured value after a predefined event, for example a defined time grid or some other event, for example a low battery charge state, may be possible. For example, if a high-output CPU is completely switched off, the power consumption may be significantly reduced when compared to that of known systems.

According to an embodiment of the invention, the monitoring unit is designed to switch the control unit to sleep mode after the deactivation signal has been received. In this way complete switching off of the control unit may be carried out by the monitoring unit. When the monitoring unit completely deactivates the control unit, the power consumption or energy consumption of the control unit during sleep mode may be reduced to 0.

As an alternative to this it may be possible for the control unit to automatically switch itself off after the deactivation signal has been transmitted to the monitoring unit.

According to an embodiment of the invention, the control device comprises a power supply to supply the control unit and the monitoring unit with power, wherein the monitoring unit is designed to switch the control unit to operating mode in that it connects the control unit to the power supply.

In this way a situation may be achieved in which the control unit in sleep mode is disconnected from the power supply and cannot consume any current. In this way the energy consumption of the control unit may be still further reduced when compared to the energy consumption of the control unit in a power saving mode.

According to an embodiment of the invention, the monitoring unit may be suppliable with power separately from the control unit. To this effect the power supply can, for example, comprise automatically switchable supply units for the individual components of the control, for example the control unit, the monitoring unit, the measuring unit and the communication unit.

According to an embodiment of the invention, the monitoring unit may also be designed to switch the control unit to the sleep mode in that it disconnects the control unit from the power supply.

According to an embodiment of the invention, the power supply may comprise a power connection, for example a line, that is connected to an electricity network.

According to an embodiment of the invention, the power supply may comprise an energy storage device, for example a battery or an accumulator.

According to an embodiment of the invention, the control device further comprises an energy monitor, wherein the energy monitor is designed to transmit the activation signal to the monitoring unit when a charge state of the energy storage device exceeds a predefined value. For example, energy may be charged to the energy storage device by way of a solar module of the field device. The monitoring unit activates the control unit only if the energy storage device has reached a charge state in which sufficient energy is stored in the energy storage device for the control to be activated, for a measured value to be determined, and for this measured value, for example, to be transmitted to a receiver so that the control unit may have the above-mentioned functions carried out. Subsequently, the control unit switches to sleep mode again, and the energy storage unit can be recharged.

According to an embodiment of the invention, the energy monitor is designed to transmit the activation signal to the monitoring unit when a discharge state of the energy storage device falls below a predefined value. In this case the control unit can, for example, transmit a message to a central monitoring unit, to the effect that the energy storage device, for example a battery or an accumulator, needs to be exchanged. However, the predefined charge state can also be selected so that in addition or as an alternative a last measured value can be determined before there is no longer enough energy for determining a measuring value and for sending it to a central monitoring device.

According to an embodiment of the invention, the control device comprises a timer, wherein the timer is designed, at a predetermined time, or after a predetermined period of time has elapsed, to transmit the activation signal to the monitoring unit. For example, the control unit could be woken up either after an hour has elapsed, or it could be woken up on the hour, in order to determine a measuring value and to forward it.

According to an embodiment of the invention, the control unit is designed to tell the timer the predefined time, or to program the predetermined time into the timer.

The control unit may be designed to start the timer. For example, the control unit starts the timer prior to sending the deactivation signal. Subsequently, the control unit is reactivated by the monitoring unit at the predetermined time or after the predetermined period of time has elapsed.

According to an embodiment of the invention, the control device comprises a switch, wherein the activation signal is transmitted to the monitoring unit by manual triggering of the switch. In this way the control may be activated also in those cases where a service technician wishes to check the state of the control or of the entire field device.

According to an embodiment of the invention, the monitoring unit is designed, after receiving the deactivation signal, to switch further components of the field device off, or to switch them to a sleep state. By means of the deactivation of further components, for example the measuring unit or the communication unit, the energy consumption of the control may be still further reduced.

According to an embodiment of the invention, the monitoring unit is designed, after receiving the activation signal, to switch the further components on or to switch them to an operating mode.

According to an embodiment of the invention, the control, too, can be designed, prior to transmitting the deactivation signal, to switch off further components of the field device or to switch them to a sleep mode.

According to an embodiment of the invention, the control unit, too, may be designed, after activation of the control unit, to switch the further components on or switch them to an operating mode.

For example, switching the further components on or off may take place by switching the automatically switchable supply units of the energy supply. Thus the power consumption of the further components, too, can be reduced to 0 during the sleep mode of the control unit.

According to an embodiment of the invention, the monitoring unit is designed, after switch-off of the control unit, to change to a power saving mode, and, after receiving the activation signal, to end the power saving mode. In this way it is possible, for example, to use the power saving modes implemented by the manufacturer, in order to further reduce the energy consumption of the control.

The invention also relates to a field device with a control device according to an aspect of the invention. Such a field device can, for example, be a fill-level measuring system or a fill level radar. The field device can comprise a sensor which is, for example, designed for measuring the fill level, the limit or the pressure in a container, or for measuring the flow through a pipe.

Such a field device may be able to operate with very low current consumption, if necessary battery-operated or accumulator-operated. In this arrangement a powerful CPU can be controlled by a power saving unit or monitoring unit in order to be switched on by said unit when an event occurs. The monitoring unit can also switch off communication interfaces (GSM, Ethernet or similar) and switch a measuring unit or the sensor off in order to achieve a very low standby current of the field device.

The invention also relates to the use of a separate monitoring unit for deactivating a control unit of a field device.

The invention also relates to a method for controlling a field device. According to an embodiment of the invention, the method comprises the steps of: switching to a sleep mode by a control unit; transmission of a deactivation signal from the control unit to a monitoring unit prior to switching to the sleep mode; reception of an activation signal by the monitoring unit; switching of the control unit to an operating mode by the monitoring unit after receipt of the activation signal.

According to an embodiment of the invention, the method further comprises the step of: switching the control unit to the sleep mode by the monitoring unit after receipt of the deactivation signal.

According to an embodiment of the invention, the method further comprises the step of: transmission of the activation signal from a timer to the monitoring unit at a predetermined time or after a predetermined period has elapsed.

The invention also relates to a program element for a control of a field device which, when executed by the control, carries out the method according to the invention.

The invention also relates to a computer-readable medium on which the program element is stored.

The term "computer-readable medium" may refer to a diskette, a hard disk, a CD or DVD, a USB (Universal Serial Bus) storage device, a RAM (Random Access Memory), a ROM (Read Only Memory) or an EPROM (Erasable Programmable Read Only Memory). The term "computer-readable medium" may also refer to a data communication network, for example the internet, that may make it possible to download a program code.

Below, exemplary embodiments of the invention are described in detail with reference to the enclosed figures.

DETAILED DESCRIPTION OF EXEMPLARY EMBODIMENTS

Figure 1:
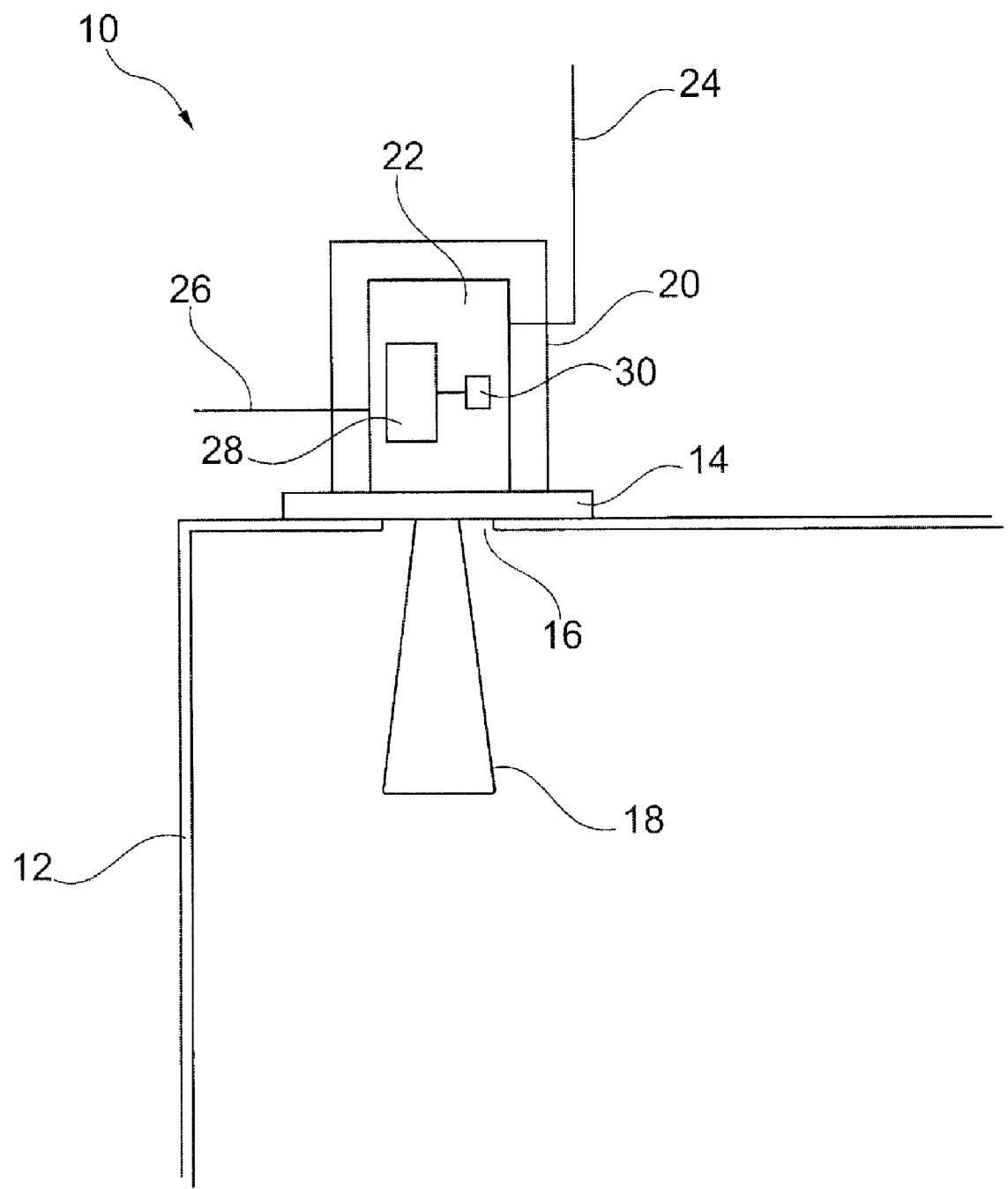
FIG. 1 diagrammatically shows a field device according to an exemplary embodiment of the invention.

The illustrations in the figures are diagrammatic and not to scale. In the following description of the figures the same reference characters are used for identical or similar elements.

FIG. 1 shows a field device 10 that is attached to a container 12 and that is, for example, designed as a fill level radar. The field device 10 is, for example, attached at an opening 16 of the container by means of a mounting plate 14, with a sensor 18 projecting through said opening 16 into the interior of the container 12. Opposite the sensor 18, with reference to the mounting plate 14, there is a housing 20 in the interior of which a control 22 for the field device 10 is arranged. The control 22 in the outer region of the container 12 can be connected to an antenna 24 in order to exchange data with a receiver by way of a radio connection. Furthermore, the control 22 can be connected by a line 26 for data communication and/or for the supply of energy.

The control 22 comprises a control unit 28 and a monitoring unit 30 that is separate thereof.

Figure 2:
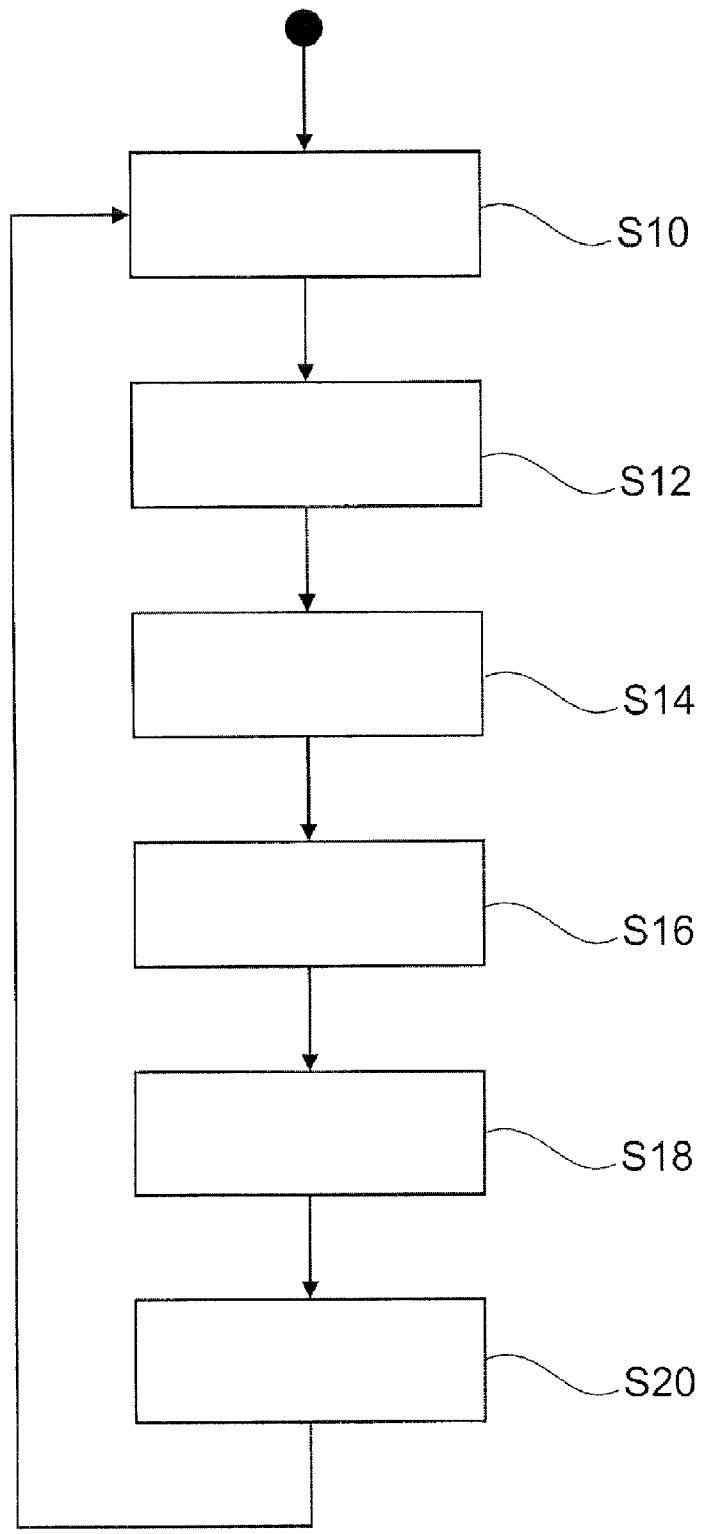
FIG. 2 shows a flow chart that depicts a control method for a field device according to an exemplary embodiment of the invention.

FIG. 2 shows a flow chart that illustrates a method for controlling the field device 10 from FIG. 1.

During step S10 the fill level radar 10 shown in FIG. 1 is in an energy-saving mode in which the energy consumption of the control 22 is very considerably reduced. During the energy-saving mode the control unit 28 is in a sleep mode and is switched off. The monitoring unit 30 awaits an activation signal from a timer.

In step S12 the monitoring unit 30 receives the activation signal of the timer.

In step S14 the control unit 28 is woken up by the separate monitoring unit 30, in that it is connected to the energy supply 26 of the field device 10.

In step S16 the control unit 28 carries out various control functions for the field device 10. Said control unit 28 instructs, for example, a measuring unit of the field device 10 to transmit, by way of the horn antenna 18, a radar signal into the interior of the container 12 and to acquire the reflected signal. The control unit 28 processes the signals that arise in the sensor 18, and transmits the determined measured value by way of a radio connection and the antenna 24 to a central computer.

In step S18 the control unit 28 programs the timer as to the point in time at which the next operating mode is to start, and transmits a deactivation signal to the monitoring unit 30.

In step S20 the monitoring unit 30 switches the control unit 28 back to the sleep mode, in that it disconnects it from the energy supply 26 of the control 22. The method is continued in step S10.

Figure 3:
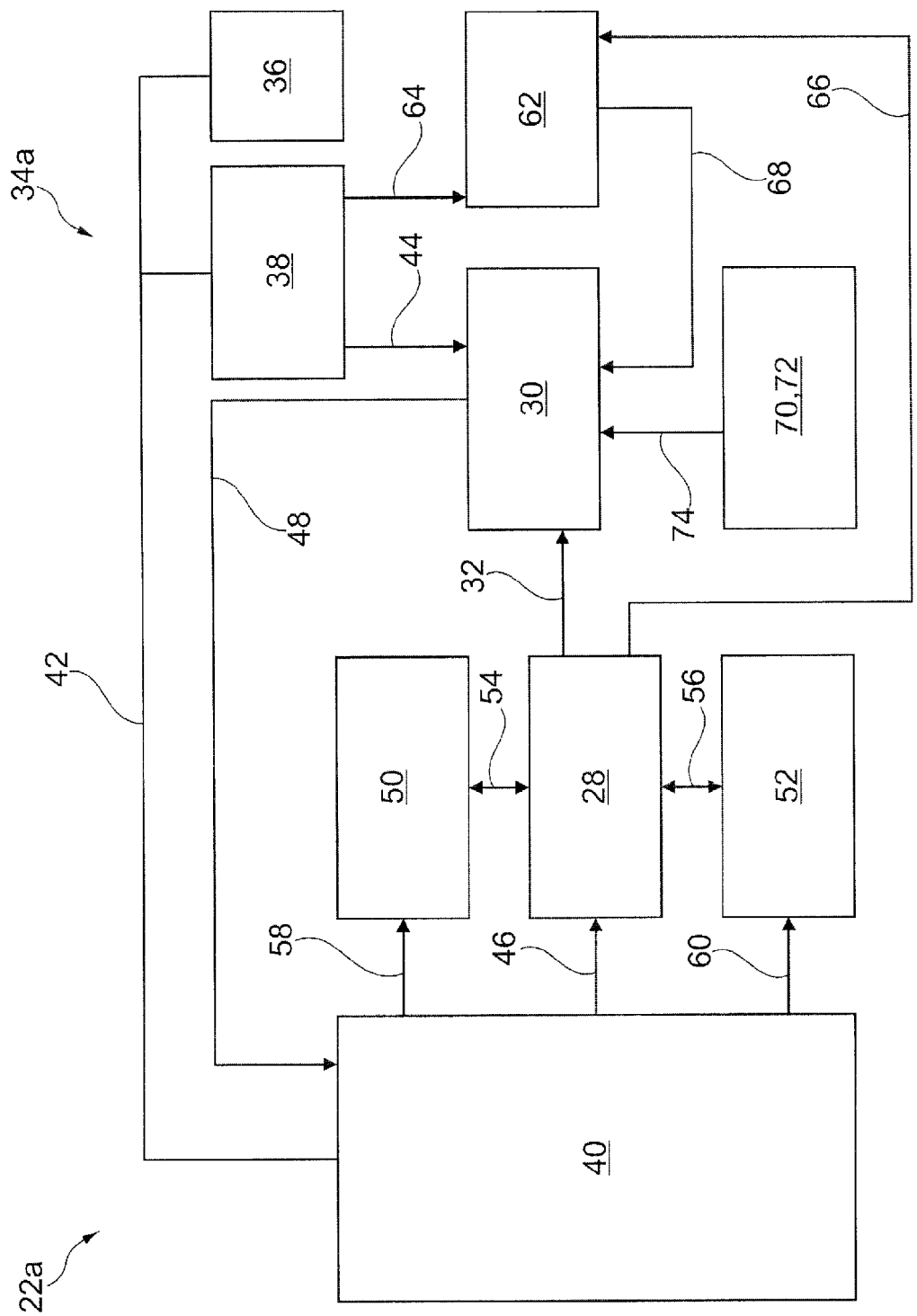
FIG. 3 diagrammatically shows the structure of a control unit according to an exemplary embodiment of the invention.

FIG. 3 diagrammatically shows the design of a control device 22a, which can be built into the field device 10, as can the control 22. The control 22a comprises a control unit 28 that comprises a CPU with a memory and interfaces. Byway of a signal line 32 the control unit 28 can transmit a deactivation signal to a monitoring unit 30, in the present embodiment a low-power microcontroller 30.

The control 22a comprises a power supply 34a that comprises an energy storage device 36 in the form of a battery or an accumulator, and two supply units 38 and 40 that are connected to the energy storage device 36 by way of a shared power supply line 42 or a DC bus 42. By way of the power supply line 44 the monitoring unit 30 is supplied with current by the supply unit 38. By way of the power supply line 46 the control unit 28 is supplied with current by the supply unit 40.

The supply unit 40 is automatically switchable. In a switched-off or deactivated state, the power supply from the DC bus 42 to the power supply line 46 is interrupted. In a switched-on or activated state of the supply unit 40, current can be transmitted from the DC bus 42 to the control unit 28 by way of the power supply line 46. By way of the signal line 48, the monitoring unit 30 can transmit a switch-off signal or switch-on signal to the supply unit 40, after which the latter in each case switches, or switches over, to the switched-on or switched-off state.

The control 22a comprises a measuring unit 50 and a communication interface 52, which, by way of the signal lines 54 and 56, are both in bidirectional data communication with the control unit 28. Like the control unit 28, the measuring unit 50 and the communication unit 52 are connected to the supply unit 40 by way of the power supply lines 58 or 60. As is the case with the power supply line 46, the power supply lines 58 and 60 are disconnected from the DC bus 42 in the switched-off state of the supply unit 40. In the switched-on state of the supply unit 40, the measuring unit 50 and the communication unit 52 can be supplied with current by way of the lines 58 and 60. Thus, by transmitting the switch-on or switch-off signal by way of the line 48, the monitoring unit 30 can simultaneously switch on or off, or disconnect from or connect to the power supply, the control unit 28, the measuring unit 50 and the communication unit 52.

The control 22a comprises a timer in the form of a real-time clock 62, which, by way of the power supply line 64, can be supplied with current by the supply unit 38. By way of a signal line 66 the control 28 can program the real-time clock 62 and in this process can set an alarm or a predetermined time in the real-time clock 62. By way of a signal line 68, the real-time clock 62 can transmit a real-time clock alarm or an activation signal to the monitoring unit 30.

The control 22a operates as follows: after a message has been transmitted by way of the communication unit 52, the control unit 28 programs an alarm time for the next planned message transmission, which programming takes place in the real-time clock 62. In the message, for example, a just previously measured value can be coded. Thereafter, with the use of a deactivation signal, by way of the signal line 32, the control unit 28 signals to the monitoring unit 30 that the power saving mode or sleep mode can be activated. By means of a switch-off signal, by way of the signal line 48, the monitoring unit 30 switches off the supply unit 40 of the communication unit 52, the measuring unit 50 and the control unit 28 as well as optionally further components, for example an external flash and RAM. After this, only the real-time clock 62, the monitoring unit 30 and its supply unit 38 are still active. At this point in time the monitoring unit 30 itself switches to a power saving mode and waits for the alarm signal or activation signal from the real-time clock 62 by way of the signal line 68. This alarm signal or activation signal first wakes up the monitoring unit 30, whereupon the latter then, by way of the signal line 48, transmits a switch-on signal to the supply unit 40, and thus switches on or activates the supply unit 40 of the control unit 28 as well as of the measuring unit 50 and of the communication unit 52, and optionally switches on or activates further components such as the external flash and RAM. At this point in time the main CPU 28 or control unit 28 can again transmit a message before subsequently being switched to sleep mode again.

The control 22a may furthermore comprise a push-button or push-button switch 70 and/or a comparator 72. By way of a signal line 74, the push-button switch 70 and the comparator 72 can transmit an activation signal to the monitoring unit 30.

In order to make it possible to activate the control 22a also apart from those times when activation signals triggered by the real-time clock 62 are received, the monitoring unit 30 may be activated not only by an alarm from the real-time clock 62, but also by further signals. In this arrangement the monitoring signal is transmitted from the push-button switch 70 to the monitoring unit 30 when the push-button switch 70 is manually activated, which then leads to manual triggering of the transmission of the message from the communication unit 52, or when the comparator measures a minimum charge voltage in the accumulator 36, which then leads to the triggering of a message when this minimum charge voltage has been reached.

Apart from the dispatch of a message as the activity to be carried out by the control unit 28, any activities of the field device 10, which activities require a powerful CPU 28, can be carried out. Otherwise, the powerful CPU is in sleep mode in order to optimise the total energy requirement of the control 22a.

Figure 4:
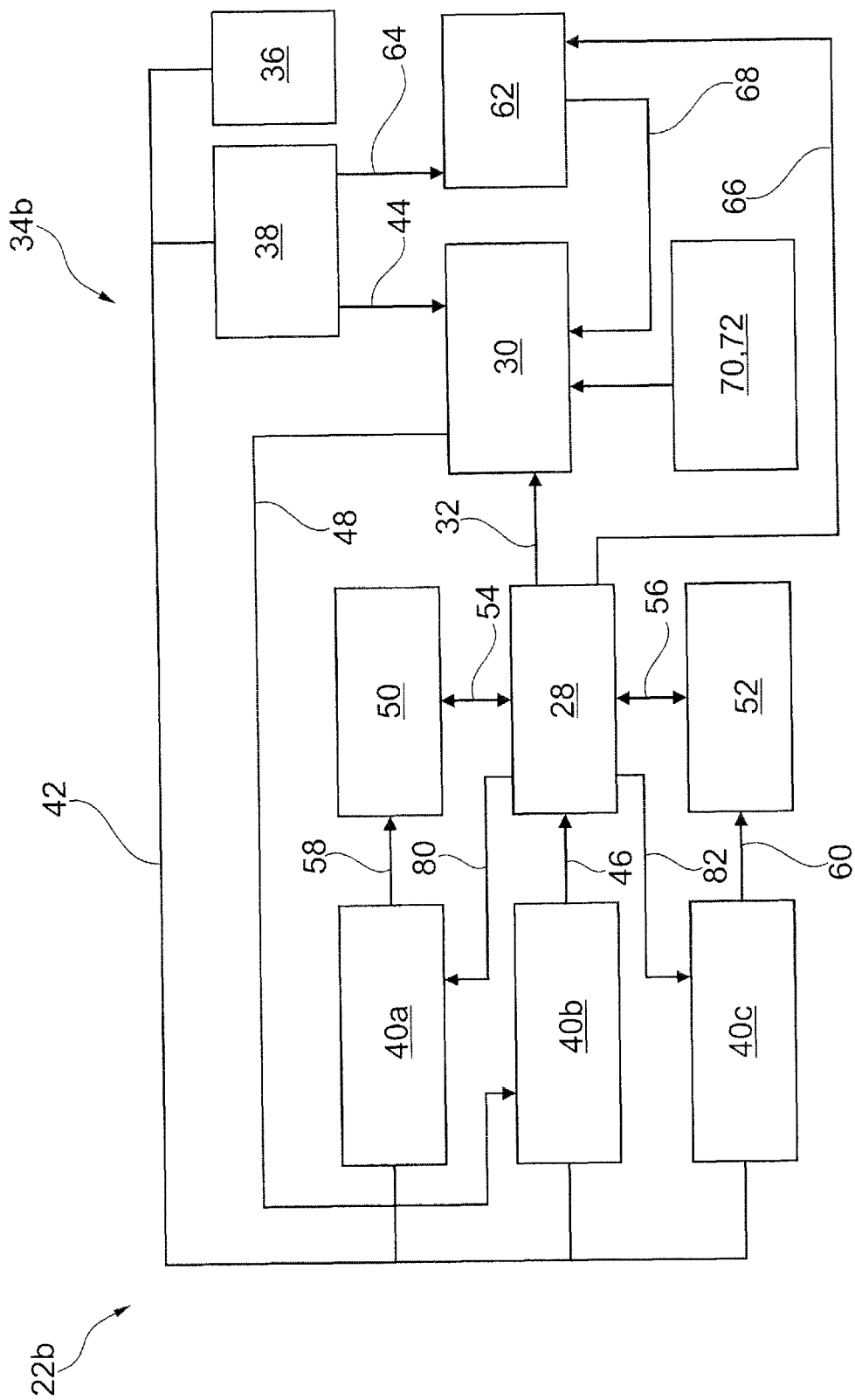
FIG. 4 diagrammatically shows the design of a control unit according to a further exemplary embodiment of the invention.

FIG. 4 diagrammatically shows the design of an alternative exemplary embodiment of a control 22b, which may also be incorporated in the field device 10 analogously to the control 22a. The elements shown in FIG. 4 that have identical reference characters to the elements shown in FIG. 3 may have the characteristics and functions described with reference to FIG. 3.

In contrast to the control 22a, the control 22b, instead of the supply unit 40, comprises three separate power supply units 40a, 40b and 40c that are connected to the DC bus 42. As is the case with the supply unit 40, the supply units 40a, 40b, and 40c are automatically switchable. In this arrangement the supply unit 40b may, analogously to the supply unit 40 from FIG. 3, receive a switch-on signal or switch-off signal from the monitoring unit 30 by way of the line 48.

However, in the control 22b, switching the supply units 40a and 40c on and off is carried out by the control unit 28 in that it transmits switch-on signals or switch-off signals to the supply unit 40a or 40c by way of the signal lines 80 and 82. The control unit 28 first determines the external components, for example the measuring unit 50 or the communication-unit 52, which are disconnected from the power supply before the monitoring unit 30 disconnects the control unit 28 and other components, for example an external flash and a RAM, from the power supply 34b.

In this arrangement the power supply 34b of the control 22b comprises the energy storage device 36, the supply unit 38 and the supply units 40a, 40b and 40c.

Figure 5:
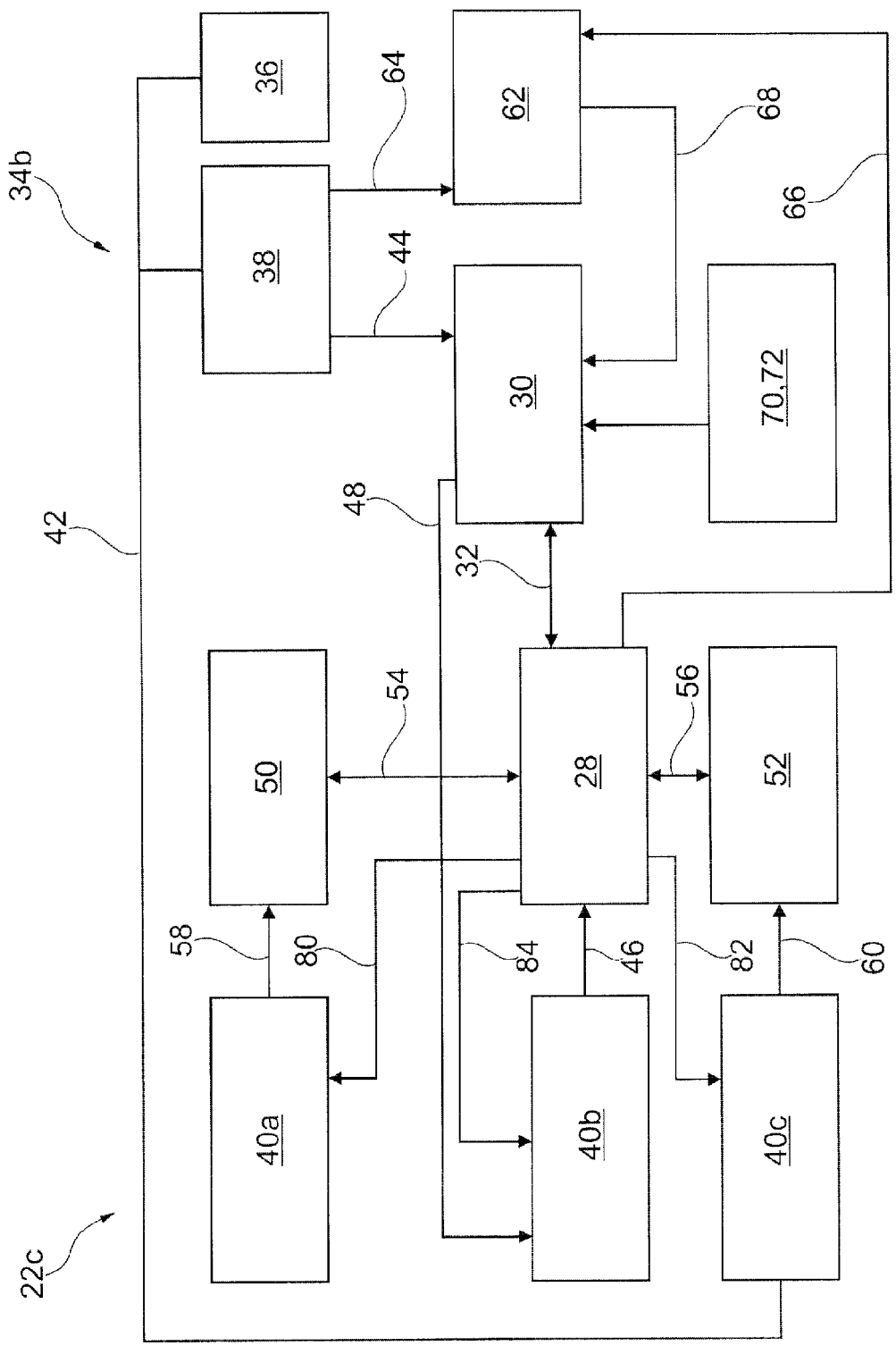
FIG. 5 diagrammatically shows the design of a control according to a further exemplary embodiment of the invention.

FIG. 5 shows a further exemplary embodiment of a control 22c that can be installed in the field device 10 analogously to the control 22a. The elements shown in FIG. 5 that have identical reference characters to the elements shown in FIG. 3 or FIG. 4 can have the characteristics and functions described with reference to FIG. 3 or FIG. 4.

In the case of the control 22c shown in FIG. 5, bi-directional communication between the control 28 and the monitoring unit 30 can take place by way of the signal line 32.

On the one hand this may be utilised to communicate sleep mode to the control unit 28 of the monitoring unit 30. The control unit 28 may then switch itself off in that it transmits a switch-off signal to the supply unit 40b by way of the signal line 84. In the case of an event that can be triggered by the real-time clock 62 or by further components 70, 72 of the control 22c, the monitoring unit 30 transmits a switch-on signal to the supply unit 40b by way of the signal line 48 so that the monitoring unit 30 switches the control unit 28 on again.

On the other hand, bidirectional communication can be used in order to transmit data generated in the monitoring unit 30 to the control unit 28, for example in those cases where the monitoring unit 30 can carry out additional measuring tasks or acquisitions. If need be, the monitoring unit 30 itself can generate or trigger events. The state of the control unit 28, or the state of the entire system 22c, can be stored in the monitoring unit 30. The monitoring unit 30 can also be parameterized or calibrated by the control unit 28.

The control unit 28 and the monitoring unit 30 can comprise EPROMs on which programs are stored by means of which the methods described with reference to the figures are carried out, in which methods the programs are executed by the control unit 28 and the monitoring unit 30.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A control device for a field device, comprising:
    a control unit controlling the field device, and
    a separate monitoring unit, wherein the control unit selectively switches to one of an operating mode and a sleep mode, wherein the control unit, before the sleep mode is assumed, transmits a deactivation signal to the separate monitoring unit, wherein the separate monitoring unit, after an activation signal has been received, switches the control unit to the operating mode, wherein the separate monitoring unit switches the control unit to sleep mode after the deactivation signal has been received by disconnecting the control unit from a power supply, wherein the control unit, prior to transmitting the deactivation signal, switches further components of the field device off, and wherein the control unit, after activation of the control unit, switches the further components on.

2. The control device according to claim 1, further comprising:
    a power supply supplying the control unit and the separate monitoring unit with power, wherein the separate monitoring unit switches the control unit to operating mode in that it connects the control unit to the power supply.

3. The control device according to claim 1, wherein the power supply comprises an energy storage device.

4. The control device according to claim 1, further comprising:
    an energy monitor configured to one of (1) transmit the activation signal to the separate monitoring unit when a charge state of the energy storage device exceeds a predefined value and (2) transmit the activation signal to the separate monitoring unit when a discharge state of the energy storage device falls below a predefined value.

5. The control device according to claim 1, further comprising:
    a timer transmitting the activation signal to the separate monitoring unit one of (a) at a predetermined time and (b) after a predetermined period of time has elapsed,
    wherein the control unit provides the timer with the predefined time.

6. The control device according to claim 1, further comprising:
    a switch, wherein the activation signal is transmitted to the separate monitoring unit by manual triggering of the switch.

7. A field device, comprising:
    a control device including a control unit controlling the field device and a separate monitoring unit,
    wherein the control unit selectively switches to one of an operating mode and a sleep mode, wherein the control unit, before the sleep mode is assumed, transmits a deactivation signal to the separate monitoring unit, wherein the separate monitoring unit, after an activation signal has been received, switches the control unit to the operating mode, wherein the separate monitoring unit switches the control unit to sleep mode after the deactivation signal has been received by disconnecting the control unit from a power supply, wherein the control unit, prior to transmitting the deactivation signal, switches further components of the field device off, and wherein the control unit, after activation of the control unit, switches the further components on.

8. A method for controlling a field device, comprising:
    switching to a sleep mode by a control unit;
    transmitting of a deactivation signal from the control unit to a separate monitoring unit prior to switching to the sleep mode;
    switching off further components of the field device with the control unit prior to transmitting the deactivation signal,
    switching the control unit to the sleep mode by the separate monitoring unit after receipt of the deactivation signal by disconnecting the control unit from a power supply in the sleep mode;
    receiving of an activation signal by the separate monitoring unit; and
    switching of the control unit to an operating mode by the separate monitoring unit after receipt of the activation signal;
    switching on the further components with the control unit after activation of the control unit.

9. A non-transitory computer-readable medium on which a program element for a control for a field device is stored, the program element when executed by the control, carries out a method which comprises of the following steps:
    switching to a sleep mode by a control unit;
    transmitting of a deactivation signal from the control unit to a separate monitoring unit prior to switching to the sleep mode;
    switching off further components of the field device with the control unit prior to transmitting the deactivation signal;
    switching the control unit to the sleep mode by the separate monitoring unit after receipt of the deactivation signal by disconnecting the control unit from a power supply in the sleep mode; receiving of an activation signal by the separate monitoring unit; and
    switching of the control unit to an operating mode by the separate monitoring unit after receipt of the activation signal;
    switching on the further components with the control unit after activation of the control unit.

* * * * *